UNITED STATES PATENT OFFICE.

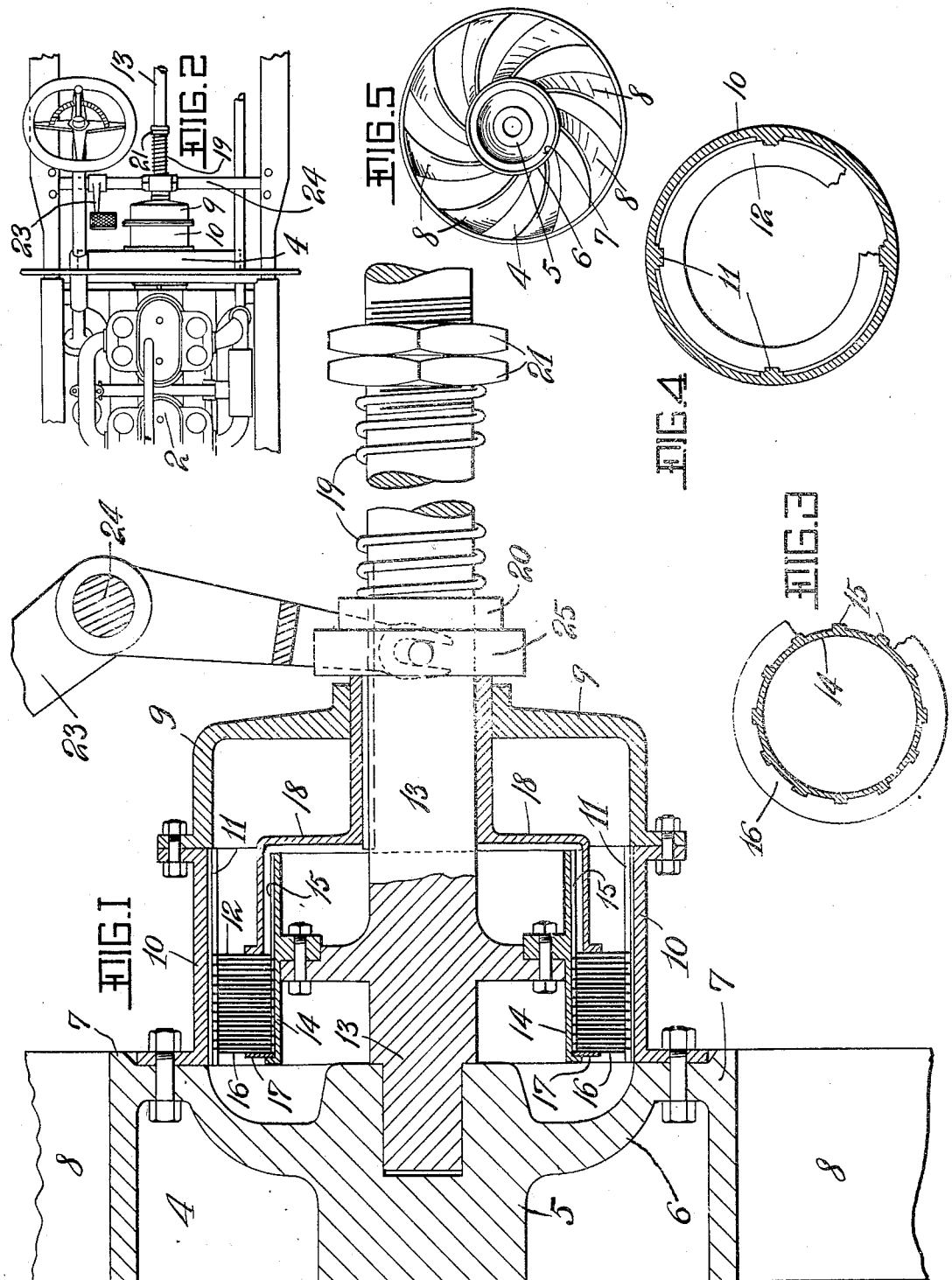

GIOVANNI ENRICO, OF TURIN, ITALY, ASSIGNOR, BY MESNE ASSIGNMENTS, TO SOCIETA FABBRICA ITALIANA AUTOMOBILI DI TORINO, OF TURIN, ITALY, A CORPORATION OF ITALY.

FRICTION-CLUTCH.

No. 891,799. Specification of Letters Patent. Patented June 23, 1908.

Application filed December 10, 1906, Serial No. 347,042. Renewed April 15, 1908. Serial No. 427,211.

*To all whom it may concern:*

Be it known that I, GIOVANNI ENRICO, a subject of the King of Italy, residing at Turin, Italy, in the Province of Piedmont, Italy, have invented certain new and useful Improvements in Friction-Clutches, of which the following is a full, clear, and exact specification.

This invention relates to friction clutches and more particularly has reference to improvements in the construction and arrangement of clutches such as are used in vehicles, wherein it is desired to start the vehicle without shock, and to at times reduce the speed temporarily without shifting the speed controlling mechanism.

The objects of the invention are to construct a clutch which shall have a large amount of friction surface, thereby reducing the degree of heating, and arranged outside the flywheel in such manner as to be cooled by means of an air blast produced by the flywheel itself.

The invention is shown, with reference to one form thereof in the accompanying drawings, wherein, Figure 1 is a sectional view, showing the invention; Fig. 2 is a plan view showing the invention with relation to the driving mechanism of a vehicle; Figs. 3 and 4 are details showing the clutch disks, and Fig. 5 is a view showing the flywheel.

1 represents a shaft driven by an engine 2, 3 a bearing, and 4 a flywheel. The flywheel has a hub 5 with a web 6 and an inner flange 7, and spokes 8 formed as fan blades, so as to direct a current of air over the clutch casing to cool it. The clutch is outside of, and at the rear of the flywheel, and is contained within a casing 9, 10 bolted to the flywheel. The casing 10 has a number of interior splines 11, on which a series of clutch disks 12 are slidably mounted.

13 is a driven shaft carrying splines 15 on which are slidably mounted a number of disks 16 alternating with disks 12. By using a number of disks a large friction surface can be secured without increasing the size of the clutch materially. In order to force the disks rearwardly against collar 17 on drum 14 and clutch shafts 1 and 13, a sleeve 18 is splined on the shaft 13 and is operated by a spring 19 and a sliding ring 20, nuts 21 being provided to control the tension of the spring.

Normally the spring and sleeve 18 force the disks together and couple shafts 1 and 13 without any slip, but when it is desired to uncouple the shafts, a lever 23 pivoted at 24, is pressed downward to throw a ring 25 against ring 20 and spring 19, thereby relieving the pressure on sleeve 18 and permitting the disks 16 and 20 to slip one on the other. Also in starting up the vehicle, the pressure of the spring can be relieved in whole or in part, thereby enabling the vehicle to be started without shock.

It will be seen that the clutch being at the rear and outside of the flywheel, the rearwardly directed blast of air from the vanes 8 of flywheel 4 acts to cool the outside casing of the clutch and prevent overheating, since whenever the conditions are such as to heat the clutch disks, there will be a strong current of air from the fan blades, by reason of faster revolution of the flywheel.

The invention is not to be restricted to the exact construction herein shown, as the principles thereof may be carried out in other ways and the invention to uses other than in the type of vehicle herein shown.

Having thus described my invention, I declare that what I claim as new and desire to secure by Letters Patent, is,—

1. The combination with a fly-wheel carrying a casing, of a plurality of disks slidably carried by the interior of said casing and rotating therewith, a driven shaft carrying a drum, a series of disks slidably mounted on the exterior of said drum and alternating with said first series of disks, a sleeve sliding on said driven shaft within, and projecting through said casing, for operating said disks, said sleeve inclosing the end of said drum, a spring on said driven shaft and bearing against a ring carried thereby, said spring through said ring acting on said sleeve to bind said disks together, and means for moving said ring longitudinally of said driven shaft to relieve the pressure of said spring, substantially as described.

2. The combination with a fly-wheel carrying a casing, of a plurality of flat disks slidably carried by the interior of said casing and rotating therewith, a driven shaft carrying a drum, a series of flat disks slidably mounted on the exterior of said drum and alternating with said first series of flat disks, a sleeve sliding on said driven shaft within, and projecting through said casing, for operating said disks, said sleeve inclosing the end of said drum, a single spring on said driven shaft and bearing against a ring carried thereby, said spring through said ring acting on said sleeve to bind said disks together, and a loose ring between said slidable ring and said sleeve for operating said slidable ring to relieve the pressure of the spring on the disks, substantially as described.

In testimony whereof I affix my signature, in presence of two witnesses.

GIOVANNI ENRICO.

Witnesses:
  C. HAUSSMAN,
  JOSEPH FORNOS.